United States Patent
Trainin et al.

(10) Patent No.: US 10,230,561 B2
(45) Date of Patent: Mar. 12, 2019

(54) APPARATUS, SYSTEM AND METHOD OF COMMUNICATING A PHYSICAL LAYER CONVERGENCE PROCEDURE (PLCP) PROTOCOL DATA UNIT (PPDU)

(71) Applicant: INTEL IP CORPORATION, Santa Clara, CA (US)

(72) Inventors: Solomon B. Trainin, Haifa (IL); Assaf Kasher, Haifa (IL); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 192 days.

(21) Appl. No.: 15/199,636

(22) Filed: Jun. 30, 2016

(65) Prior Publication Data

US 2018/0006866 A1 Jan. 4, 2018

(51) Int. Cl.
*H04L 27/26* (2006.01)
*H04L 1/00* (2006.01)
(Continued)

(52) U.S. Cl.
CPC ........ *H04L 27/2666* (2013.01); *H04L 1/0003* (2013.01); *H04L 1/0009* (2013.01); *H04W 74/002* (2013.01); *H04W 74/0816* (2013.01)

(58) Field of Classification Search
CPC ..... H04L 7/00; H04L 27/2666; H04W 74/002
See application file for complete search history.

(56) References Cited

U.S. PATENT DOCUMENTS

2008/0043681 A1 2/2008 Vimpari et al.
2009/0067396 A1 3/2009 Fischer
(Continued)

FOREIGN PATENT DOCUMENTS

EP 2378695 10/2011
KR 20130009959 1/2013

OTHER PUBLICATIONS

IEEE Std 802.11™-2012. IEEE Standard for Information technology— Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Rhonda L Murphy
(74) *Attorney, Agent, or Firm* — Shichrur & Co.

(57) ABSTRACT

Some demonstrative embodiments include apparatuses, devices, systems and methods of communicating a Physical Layer Convergence Procedure (PLCP) Protocol Data Unit (PPDU). For example, an apparatus may include circuitry and logic configured to cause a wireless station to transmit a first PPDU to a second wireless station, the first PPDU including a preamble, a header, and a first PLCP Service Data Unit (PSDU), the header including a synchronization (sync) indicator to indicate that the second wireless station is to synchronize a second PPDU to the first PPDU; and to receive the second PPDU from the second wireless station, the second PPDU spaced from the first PPDU by less than a Short Inter Frame Space (SIFS), the second PPDU including a Byte Count, and a second PSDU, the second PPDU including no preamble or a short preamble, which is shorter than the preamble of the first PPDU.

25 Claims, 4 Drawing Sheets

(51) Int. Cl.
*H04W 74/00* (2009.01)
*H04W 74/08* (2009.01)

(56) References Cited

U.S. PATENT DOCUMENTS

| | | |
|---|---|---|
| 2012/0182983 A1 | 7/2012 | Stephens et al. |
| 2014/0321349 A1* | 10/2014 | Seok .................... H04W 74/08 370/311 |
| 2016/0241681 A1* | 8/2016 | Tahir ....................... H04L 69/22 |
| 2017/0127440 A1* | 5/2017 | Chun ................ H04W 72/1284 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
International Search Report and Written Opinion for PCT/US2017/034907, dated Aug. 29, 2017, 15 pages.
International Preliminary Report on Patentability for PCT/US2017/034907 dated Jan. 10, 2019, 7 pages.

* cited by examiner

APPARATUS, SYSTEM AND METHOD OF COMMUNICATING A PHYSICAL LAYER CONVERGENCE PROCEDURE (PLCP) PROTOCOL DATA UNIT (PPDU)

TECHNICAL FIELD

Embodiments described herein generally relate to communicating Physical Layer Convergence Procedure (PLCP) Protocol Data Units (PPDUs).

BACKGROUND

In some wireless networks, a standard of communication may increase a bit rate of communication between wireless communication devices, e.g., compared to a previous standard of communication.

The wireless communication devices may be configured to exchange data using one or more Physical Layer Convergence Procedure (PLCP) Protocol Data Units (PPDUs).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
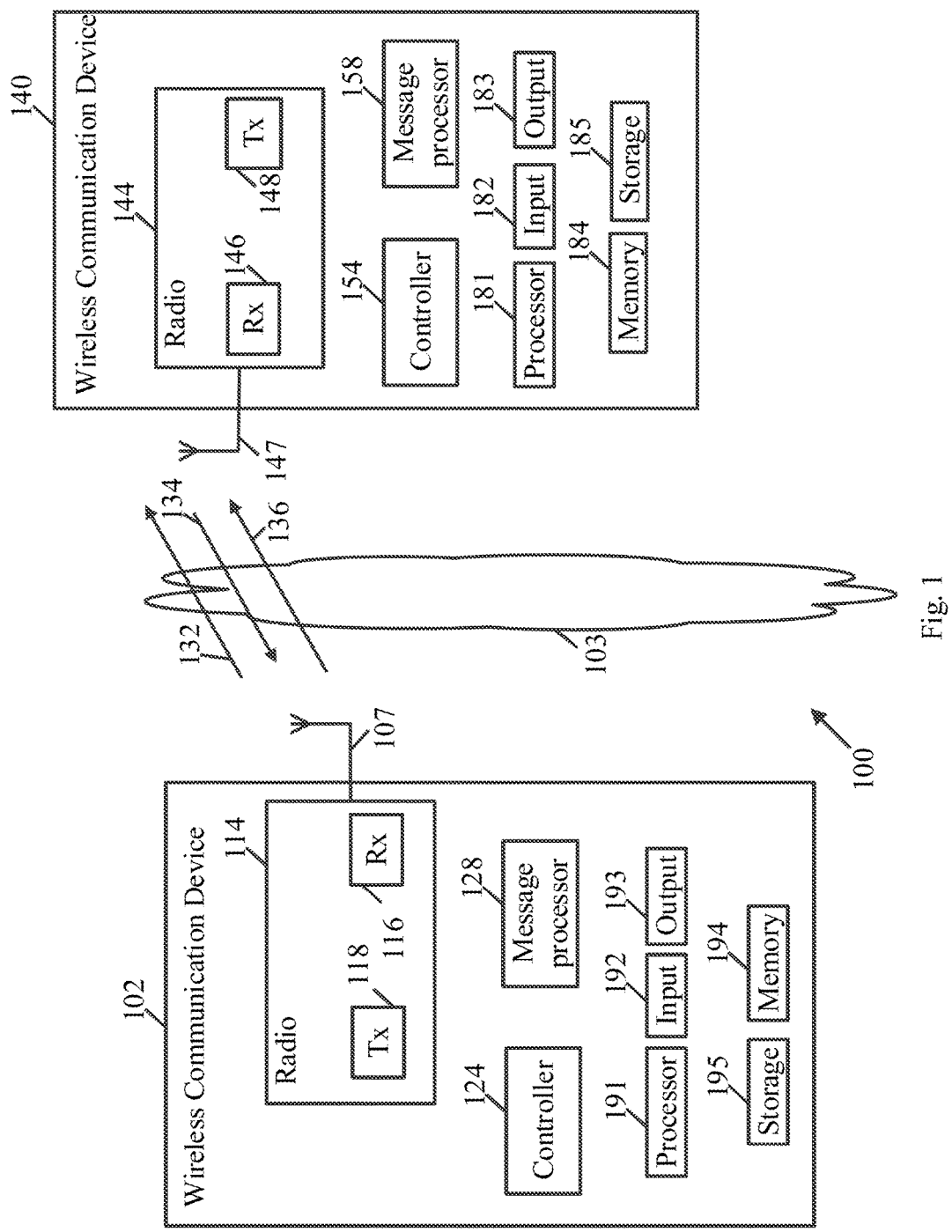
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE*802.11-2012, *IEEE Standard for Information technology—Telecommunications and information exchange between systems Local and metropolitan area networks—Specific requirements Part 11: Wireless LAN Medium Access Control (MAC)and Physical Layer (PHY)Specifications*, Mar. 29, 2012); IEEE802.11ac-2013 (*"IEEE P*802.11*ac-2013, IEEE Standard for Information Technology—Telecommunications and Information Exchange Between Systems—Local and Metropolitan Area Networks—Specific Requirements—Part* 11: *Wireless LAN Medium Access Control (MAC)and Physical Layer (PHY)Specifications—Amendment* 4: *Enhancements for Very High Throughput for Operation in Bands below* 6*GHz"*, December, 2013); IEEE 802.11ad (*"IEEE P*802.11*ad-2012, IEEE Standard for Information Technology—Telecommunications and Information Exchange Between Systems—Local and Metropolitan Area Networks—Specific Requirements—Part* 11: *Wireless LAN Medium Access Control (MAC)and Physical Layer (PHY)* Specifications—Amendment 3: *Enhancements for Very High Throughput in the* 60*GHz Band"*, 28 Dec. 2012); IEEE-802.11REVmc (*"IEEE* 802.11*-REVmcTM/D*3.0, June 2014 *draft standard for Information technology—Telecommunications and information exchange between systems Local and metropolitan area networks Specific requirements; Part* 11: *Wireless LAN Medium Access Control (MAC)and Physical Layer (PHY)Specification"*); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC)and Physical Layer (PHY)Specifications—Amendment: Enhanced Throughput for Operation in License-Exempt Bands Above* 45 GHz)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBeeTM, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may operate as and/or perform one or more functionalities of any other wireless device and/or station, e.g., a WLAN STA, a WiFi STA, and the like.

In some demonstrative embodiments, device 102 and/or device 140 may be configured to operate as, perform a role of, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform a role of, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform a role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some demonstrative embodiments may be implemented, for example, as part of a new standard in an mmWave band, e.g., a 60 GHz frequency band or any other directional band, for example, as an evolution of an *IEEE* 802.11*ad standard*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase data transmission rates defined in the *IEEE* 802.11*ad specification*, which may, for example, satisfy growing demand in network capacity for new coming applications.

Some communications over a wireless communication band, for example, a DMG band or any other band, may be performed over a single channel bandwidth (BW). For example, the *IEEE* 802.11*ad Specification* defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the *IEEE* 802.11*ad Specification* or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an *IEEE* 802.11*ad Specification*, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may be configured to support one or more mechanisms and/or features, for example, channel bonding, single user (SU) MIMO, and/or and multi user (MU) MIMO, for example, in accordance with an *IEEE* 802.11*ay* Standard and/or any other standard and/or protocol.

In some demonstrative embodiments, devices 102 and/or 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In one example, an EDMG STA may include a DMG STA whose radio transmitter is capable of transmitting and receiving EDMG Physical Layer Convergence Procedure (PLCP) Protocol Data Units (PPDUs). The EDMG STA may perform any other additional or alternative functionality.

In some demonstrative embodiments, devices 102 and/or 140 may include EDMG STAs capable of communicating in an EDMG BSS.

In some demonstrative embodiments, a new generation of an *IEEE* 802.11 standard may increase a bit rate provided by physical layer (PHY), e.g., compared to a bit rate provided by a previous *IEEE* 802.11 Standard.

For example, the *IEEE* 802.11*ay* Standard may increase a bit rate provided by physical layer (PHY), e.g., compared to a bit rate provided by the PHY in the *IEEE* 802.11*ad* Standard.

In some demonstrative embodiments it may be complex and/or inefficient to increase a throughput at a MAC layer of a wireless station, e.g., a MAC Service Access Point (SAP), at the same proportion as the increase in the PHY bit rate, for example, at least due to a link access overhead, which may be introduced, e.g., according to a Wi-Fi or a WiGig link access mechanism.

In some demonstrative embodiments, the link access overhead may be based an acknowledgment mechanism, which may be an integral part of a carrier sense multiple access (CSMA) with collision avoidance (CA) (CSMA/CA) mechanism, which may be implemented at the MAC layer.

In some demonstrative embodiments, the link access overhead may be a result of a PPDU overhead.

In some demonstrative embodiments, a PPDU may be self-contained, e.g., from a PHY point of view. For example, the PHY layer may be configured to operate at a receive state to receive PPDUs, e.g., at any time. A PPDU may include, for example, all information, which may be required to detect and to decode the PPDU. The PPDU may include, for example, preamble fields configured for detection and synchronization, and/or PHY header fields including information configured to decode a payload of the PPDU. The preamble fields and/or the PHY header fields, which may be an integral part of the link access mechanism with respect to each packet being treated as an independent PHY unit, may introduce the link access overhead.

In some demonstrative embodiments, the link access overhead may be introduced by a turnaround time, e.g., a time to switch between a receive state and a transmit state, and vice versa.

In one example, the turnaround time may include, for example, a time for switching receive and/or transmit circuitry between the receive state and the transmit state, for example, by switching on and off receive and transmit circuitry of the wireless station.

In another example, the turnaround time may include a time for resetting a receiver of the wireless station according to one or more link conditions, which may be used as a baseline for detection.

In some demonstrative embodiments, increasing the PHY bit rate may increase the link access overhead, which may, in turn, decrease a remaining time to transmit a payload, e.g., a PHY Service Data Unit (PSDU), for example, since the link access overhead may consumes a greater portion of a link capacity.

In some demonstrative embodiments, devices 102 and/or 140 may be configured to communicate according to a mechanism, which may enable, for example, at least to reduce, or even minimize, the link access overhead in terms of link access, e.g., as described below.

In some demonstrative embodiments, devices 102 and/or 140 may be configured to maintain synchronization between devices 120 and 140, for example, to enable to eliminate a need for communicating one or more preamble fields and/or PHY header fields, and, in some cases, even to eliminate all preamble field and/or PHY header fields, in one or more PPDUs, e.g., as described below.

For example, synchronization, e.g., a tight synchronization, may be kept between a pair of stations, e.g., an initiator station and a responder station of a transaction, thereby reducing or eliminating a need for preamble fields and/or PHY header fields, e.g., as described below.

In some demonstrative embodiments, devices 102 and/or 140 to make a turnaround decision in a manner that is MAC independent, for example, at the PHY layer, e.g., even without involving the MAC layer, e.g., as described below.

In some demonstrative embodiments, devices 102 and/or 140 may be able to keep transmit and/or receive circuitry at a ready state, e.g., powered on, for example, to enable a fast turnaround to switch between the receive state and the transmit state, for example, even without the need for switching on and off the receive and transmit circuitry.

In some demonstrative embodiments, the fast turnaround decision may enable, for example, to decrease an Inter-Frame Space (IFS) time between turnarounds, e.g., as described below.

In some demonstrative embodiments, devices 102 and 140 may be configured to generate, transmit, receive, and/or process one or more PPDUs (also referred to as "short PPDUs" or "low overhead PPDUs"), which may be configured to include no preamble or a short preamble, e.g., as described below.

In some demonstrative embodiments, communicating one or more short PPDUs may enable, for example, to reduce, e.g., to minimize, the link access overhead, e.g., as described below.

In some demonstrative embodiments, devices 102 and/or 140 may be configured to communicate a PPDU, e.g., including a preamble and/or a PHY header, and to synchronize communication of one or more subsequent PPDUs, e.g., one or more short PPDUs, for example, based on the preamble and/or PHY header of the PPDU, e.g., as described below.

In some demonstrative embodiments, controller 124 may be configured to control, cause and/or trigger device 102 to transmit a first PPDU 132 to device 140.

In some demonstrative embodiments, the first PPDU 132 may include a preamble, a header, and a first PLCP Service Data Unit (PSDU).

In some demonstrative embodiments, the header may include a synchronization (sync) indicator to indicate that device 140 is to synchronize a second PPDU to the first PPDU 132.

In some demonstrative embodiments, device 140 may receive the first PPDU 132.

In some demonstrative embodiments, controller 154 may be configured to control, cause and/or trigger device 140 to process PPDU 132 including the preamble, the header including the sync indicator, and the first PSDU.

In some demonstrative embodiments, device 140 may transmit a second PPDU 134 to device 102.

In some demonstrative embodiments, controller 154 may be configured to control, cause and/or trigger device 140 to transmit the second PPDU 134 to device 102.

In some demonstrative embodiments, the second PPDU 134 may be spaced from the first PPDU by less than a Short Inter Frame Space (SIFS).

In some demonstrative embodiments, the second PPDU 134 may be spaced from the first PPDU 232 by a Null Inter Frame Space (NIFS).

In some demonstrative embodiments, the second PPDU 134 may be spaced from the first PPDU 232 by less than 3 microseconds.

In some demonstrative embodiments, the second PPDU 134 may be spaced from the first PPDU 232 by at least 1 microsecond and no more than 2 microseconds.

In other embodiments, the second PPDU 134 may be spaced from the first PPDU 232 by any other time duration.

In some demonstrative embodiments, controller 154 may be configured to control, cause and/or trigger device 140 to synchronize transmission of the second PPDU 134, for example, based on the sync indicator in PPDU 132, which indicates that device 140 may synchronize second PPDU 134 to the first PPDU 132.

In some demonstrative embodiments, the second PPDU 134 may include a Byte Count, and a second PSDU.

In some demonstrative embodiments, the second PPDU 134 may include no preamble or a short preamble, which is shorter than the preamble of the first PPDU 132, e.g., as described below.

In some demonstrative embodiments, the second PPDU 134 may include no preamble.

In some demonstrative embodiments, the second PPDU 134 may include a short preamble, which may include, for example, no more than two Golay sequences.

In some demonstrative embodiments, controller 154 may be configured to control, cause and/or trigger a MAC layer of device 140 to process the second PPDU 134, e.g., for transmission, for example, while the first PPDU 132 may be processed by a PHY layer of device 140.

In some demonstrative embodiments, controller 154 may be configured to control, cause and/or trigger device 140 to generate the second PPDU 134 to include the sync indicator to indicate that the device 102 is to synchronize a third PPDU 136 to the second PPDU 134.

In some demonstrative embodiments, device 102 may receive second PPDU 134 from device 140.

In some demonstrative embodiments, controller 124 may be configured to control, cause and/or trigger device 102 to receive the second PPDU 134 from device 140, which may be spaced from the first PPDU 132 by less than the SIFS, and may include the Byte Count, the second PSDU including the no preamble or the short preamble.

In some demonstrative embodiments, device 102 may transmit a third PPDU 136 to device 140.

In some demonstrative embodiments, controller 124 may be configured to control, cause and/or trigger device 102 to transmit the third PPDU 136 spaced from the second PPDU 134 by less than a SIFS.

In some demonstrative embodiments, controller 124 may be configured to control, cause and/or trigger device 140 to synchronize transmission of third PPDU 136, for example, based on the sync indicator in PPDU 134, which may indicate that device 102 is to synchronize third PPDU 136 to the second PPDU 134.

In some demonstrative embodiments, the third PPDU 136 may include a Byte Count, and a third PSDU.

In some demonstrative embodiments, the third PPDU 136 may include no preamble or a short preamble, which is shorter than the preamble of the first PPDU 232, e.g., similar to second PPDU 134.

In some demonstrative embodiments, the third PPDU 136 may include no preamble.

In some demonstrative embodiments, the short preamble of the third PPDU 136 may include no more than two Golay sequences.

In some demonstrative embodiments, controller 102 may be configured to control, cause and/or trigger a MAC layer of device 102 to process the third PPDU 136, e.g., for transmission to device 140, for example, while the second PPDU 134 may be processed by a PHY layer of device 102.

In some demonstrative embodiments, device 140 may receive third PPDU 136 from device 102.

In some demonstrative embodiments, controller 154 may be configured to control, cause and/or trigger device 140 to receive third PPDU 136 from device 102, which may be spaced from the second PPDU 134 by less than the SIFS.

In some demonstrative embodiments, devices 102 and/or 140 may be configured to communicate PPDU frames 132, 134 and/or 136 according to one or more PHY layer parameters, for example, a Modulation and Coding Scheme (MCS), a minimal PPDU size, and/or one or more additional or alternative PHY layer parameters.

In some demonstrative embodiments, devices 102 and 140 may be configured to signal and/or negotiate the one or more PHY layer parameters to be used for communicating PPDU frames 132, 134 and/or 136, e.g., prior to the transmission of the PPDU frames 132, 134 and/or 136.

In some demonstrative embodiments, devices 102 and 140 may be configured to signal the MCS to be used for a transmission of a PPDU, e.g., prior to the transmission of the PPDU.

In some demonstrative embodiments, devices 102 and 140 may be configured to negotiate the MCS to be used for a transmission of one or more PPDUs, e.g., prior to the transmission of the PPDU.

In some demonstrative embodiments, devices 102 and 140 may exchange Request to Send (RTS) frame and Clear to Send (CTS) frame, for example, prior to the transmission of the first PPDU 132, e.g., as described below.

In some demonstrative embodiments, the RTS frame and/or CTS frame may be configured to include an indication of an MCS to be used for communication of one or more PPDUs, e.g., as described below In some demonstrative embodiments, device 102 may initiate communication with device 140, for example, by transmitting an RTS frame.

In some demonstrative embodiments, controller 124 may be configured to control, cause and/or trigger device 102 to transmit an RTS frame including an indication of an MCS, e.g., prior to transmission of the first PPDU 132.

In some demonstrative embodiments, the RTS may include an indication of an MCS to be applied to one or more PPDUs to be transmitted by device 102.

In one example, the RTS may include an indication of an MCS to be applied to third PPDU 136 to be transmitted by device 102.

In some demonstrative embodiments, device 140 may receive the RTS frame from device 102.

In some demonstrative embodiments, controller 154 may be configured to control, cause and/or trigger device 140 to receive and process the RTS frame from device 102 including the indication of the MCS, e.g., prior to the first PPDU 132.

In some demonstrative embodiments, controller 154 may be configured to control, cause and/or trigger device 140 to transmit a CTS frame to device 102, e.g., in response to the RTS frame.

In some demonstrative embodiments, the CTS frame may include an indication of an MCS to be applied to one or more PPDUs to be transmitted by device 140.

In one example, the CTS frame may include the indication of the MCS to be applied to the second PPDU 134.

In some demonstrative embodiments, device 140 may transmit the second PPDU 134, for example, according to the MCS in the CTS frame.

In some demonstrative embodiments, device 102 may receive the CTS frame including the MCS to be applied to the second PPDU 134.

In some demonstrative embodiments, device 102 may receive the second PPDU 134, for example, according to the MCS indicated in the CTS frame.

In some demonstrative embodiments, controller 124 may be configured to control, cause and/or trigger device 102 to transmit the third PPDU 136, for example, according to the MCS indicated in the RTS frame.

In some demonstrative embodiments, controller 154 may be configured to control, cause and/or trigger device 140 to process the third PPDU 136, for example, according to the MCS indicated in the RTS frame.

In some demonstrative embodiments, devices 102 and/or 140 may be configured to receive and/or process PPDU frames 132, 134 and/or 136 according to one or more Receive (Rx) parameters, e.g., as described below.

In some demonstrative embodiments, devices 102 and/or 140 may be configured to determine, signal and/or negotiate the one or more Rx parameters, for example, to process reception of PPDU frames 132, 134 and/or 136, e.g., as described below.

In some demonstrative embodiments, the one or more Rx parameters may include at least an Automatic Gain Control (AGC) parameter, and/or one or more additional or alternative parameters.

In some demonstrative embodiments, devices 102 and 140 may be configured to determine the one or more Rx parameters, for example, based on one or more PPDUs communicated between devices 102 and 140, for example, prior to PPDU frames 132, 134 and/or 136, e.g., as described below.

In some demonstrative embodiments, controller 124 may be configured to control, cause and/or trigger device 102 to determine one or more Rx parameters to be applied by device 102 to one or more received PPDUs, for example, based on one or more PPDUs received from device 140, e.g., prior to transmission of the first PPDU 132.

In some demonstrative embodiments, controller 124 may be configured to control, cause and/or trigger device 102 to process receipt of the second PPDU 134, for example, based on the one or more determined Rx parameters of device 102.

Some demonstrative embodiments, controller 154 may be configured to control, cause and/or trigger device 102 to determine one or more Rx parameters to be applied by device 140, for example, based on one or more PPDUs received from device 102, e.g., prior to transmission of the first PPDU 132.

In some demonstrative embodiments, controller 154 may be configured to control, cause and/or trigger device 140 to process receipt of first PPDU 132, for example, based on the one or more determined Rx parameters of device 140.

In some demonstrative embodiments, devices 102 and 140 may communicate a sequence of synchronized PPDUs (also referred to as "low overhead sequence").

In some demonstrative embodiments, the sequence may include at least the first PPDU 132 and second PPDU 134.

In some demonstrative embodiments, the sequence may include at least the first PPDU 132, second PPDU 134, and/or third PPDU 136.

In some demonstrative embodiments, the sequence may include at least the first PPDU 132, second PPDU 134, third PPDU 136, and/or one or more additional subsequent PPDUs to be communicated between devices 102 and 140.

In some demonstrative embodiments, devices 102 and/or 140 may be configured to determine a duration of the sequence of synchronized PPDUs, for example, according to one or more criteria, e.g., as described below.

In some demonstrative embodiments, devices 102 and/or 140 may be configured to limit a duration of the sequence of synchronized PPDUs, for example, according to one or more criteria, e.g., as described below.

In some demonstrative embodiments, devices 102 and 140 may use the protection mechanism to protect communication of the sequence of synchronized PPDUs, for example, to ensure interoperability with legacy devices, e.g., devices which may not be able to process the synchronized PPDUs and/or which may treat the synchronized PPDUS as invalid PPDUs.

In some demonstrative embodiments, devices 102 and 140 may use a protection mechanism, e.g., an RTS/CTS/Denial To Send (DTS) protection mechanism or a CTS-to-self and Contention Free End (CF-End) protection mechanism to protect communication of the sequence of synchronized PPDUs, for example, if the sequence of synchronized PPDUs is to be transmitted in a Transmit opportunity (TxOP).

In some demonstrative embodiments, devices 102 and/or 140 may be configured to limit a duration of the sequence of synchronized PPDUs, for example, to ensure the interoperability with the legacy devices.

In some demonstrative embodiments, devices 102 and/or 140 may be configured to limit a duration of the sequence of synchronized PPDUs, for example, such that limit of the synchronized PPDUs is not exceed a predefined PPDU maximal duration (PPDUMax time).

In some demonstrative embodiments, the PPDUMax time may include a time kept by legacy devices, e.g., according to an *IEEE 802.11ad Specification*. Accordingly, any legacy stations may keep a same expectation to detect a legacy preamble, for example, if the synchronized PPDU sequence is limited to occupy the wireless medium for no more that the PPDUMax time.

In some demonstrative embodiments, device 102 to communicate with device 140 the sequence of synchronized PPDUs, e.g., including at least the first PPDU 132 and second PPDU 134, as described above.

In some demonstrative embodiments, controller 124 may be configured to control, cause and/or trigger device 102 to limit a total duration of the sequence of synchronized PPDUs to be no longer than the PPDUMax time.

In some demonstrative embodiments, controller 154 may be configured to control, cause and/or trigger device 104 to limit a total duration of the sequence of synchronized PPDUs to be no longer than the PPDUMax time.

devices 102 and/or 140 may be configured to limit a duration of the sequence of synchronized PPDUs, for example, to a longer duration than the PPDUMax time, for example, when there are no legacy devices in the network, e.g., as described below.

In some demonstrative embodiments, a PCP/AP STA, e.g., device 102, may be configured to announce, for example, via an EDMG Operation element, a maximum duration of a synchronized PPDU sequence.

In some demonstrative embodiments, the PCP AP STA may be configured to change the maximum synchronized PPDU sequence duration, for example, during a lifetime of a network controller by the PCP/AP STA.

In one example, the PCP/AP STA may be configured to increase the maximum synchronized PPDU sequence duration, e.g., to be longer than the PPDUMax time, for example, if the PCP/AP STA can determine that there are no legacy devices in the vicinity of the PCP/AP STA.

In another example, the PCP/AP STA may be configured to decrease the maximum synchronized PPDU sequence duration, e.g., to be no longer than the PPDUMax time, for example, if the PCP/AP STA detects one or more legacy devices in the vicinity of the PCP/AP STA.

In some demonstrative embodiments, controller 124 may be configured to control, cause and/or trigger device 102 to limit a total duration of the sequence of synchronized PPDUs to be no longer than a duration value from a PCP/AP STA.

In some demonstrative embodiments, controller 154 may be configured to control, cause and/or trigger device 140 to limit a total duration of the sequence of synchronized PPDUs to be no longer than a duration value, which may be, for example, provided by, set by, and/or declared by, a PCP/AP STA.

Figure 2:
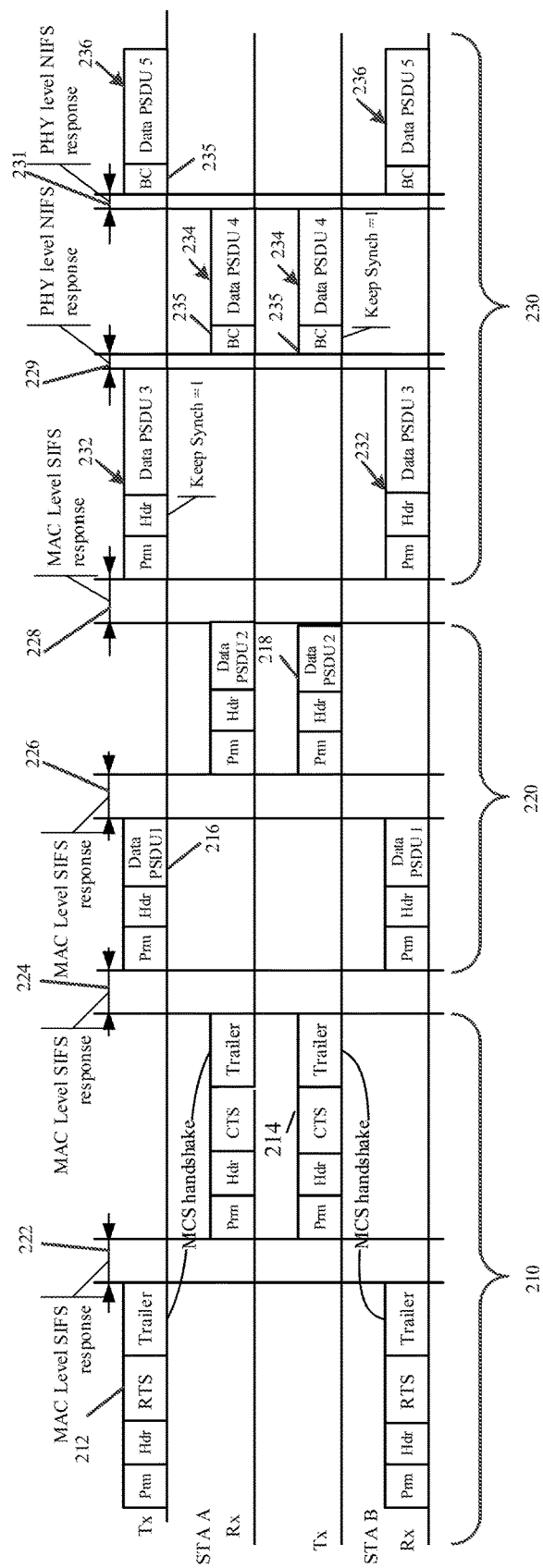
FIG. 2 is a schematic illustration of a communication protocol between a first station and a second station, in accordance with some demonstrative embodiments.

Reference is made to FIG. 2, which schematically illustrates a communication protocol 200 between a first station, denoted STA A, and a second station, denoted STA B. For example, device 102 (FIG. 1) may operate as, perform the role of, and/or perform one or more functionalities of, the STA A, and/or device 140 (FIG. 1) may operate as, perform the role of, and/or perform one or more functionalities of, the STA B.

In some demonstrative embodiments, as shown in FIG. 2, communication protocol 200 may include a first stage 210, a second stage 220, and/or a third stage 230.

In some demonstrative embodiments, as shown in FIG. 2, during the first stage 210 STA A and STA B may exchange an RTS frame 212 and a CTS frame 214.

In some demonstrative embodiments, as shown in FIG. 2, STA A may initiate a link access, and may send RTS frame 212 to STA B.

In some demonstrative embodiments, RTS frame 212 may include, e.g., in a control trailer of RTS frame 212, information with respect to one or more PHY layer parameters, e.g., which are preferred and/or requested by STA A, for communication of PPDUs between STA A and STA B.

In one example, the one or more parameters may include, for example, an MCS, a minimal PPDU size, and/or any other parameter with respect to the PPDUs.

In some demonstrative embodiments, RTS frame 212 may include values of the one or more PHY layer parameters that the STA A would like to negotiate with the STA B.

In some demonstrative embodiments, as shown in FIG. 2, STA B may receive RTS frame 212, and may send to STA A, CTS frame 214, e.g., in response to RTS frame 212.

In some demonstrative embodiments, as shown in FIG. 2, RTS frame 212 may be separated from CTS frame 214, e.g., by a first SIFS 224, for example, a MAC layer SIFS.

In some demonstrative embodiments, CTS frame 214 may include, e.g., in a control trailer of CTS frame 214, information with respect to one or more PHY layer parameters, e.g., which are preferred and/or set by STA B, for communication of the PPDUs between STA A and STA B.

For example, the STA B may include in the CTS frame 214 the one or more PHY layer parameters to be applied by the STA B during a transaction with the STA A.

For example, the STA B may set the one or more PHY layer parameters in the CTS frame 214, for example, while taking into consideration and/or keeping limitations presented by the STA A in the RTS frame 212.

In some demonstrative embodiments, as shown in FIG. 2, during the second stage 220, the STA A and the STA B may exchange a PPDU 216 and a PPDU 218.

In some demonstrative embodiments, as shown in FIG. 2, PPDU 216 may be separated from the CTS frame 214 by a second SIFS 224, e.g., a MAC layer SIFS.

In some demonstrative embodiments, as shown in FIG. 2, PPDU 216 may be separated from PPDU 218 by a third SIFS 226, e.g., a MAC layer SIFS.

In some demonstrative embodiments, as shown in FIG. 2, during the second stage 220, the STA A and the STA B may measure and store Rx parameters of an MCS, e.g., to be used for transmissions in the third stage 230.

In one example, STA A may store Rx parameters measured, for example, based on PPDU 218, e.g., to transmit PPDUs in stage 230.

In another example, STA B may store Rx parameters measured, for example, based on PPDU 216, e.g., to transmit PPDUs in stage 230.

In some demonstrative embodiments, STA A may determine a duration of stage 220 and/or how many PPDUs may be transmitted during second stage 220.

In some demonstrative embodiments, as shown in FIG. 2, during the third stage 230, the STA A and the STA B may exchange at least a first PPDU 232, a second PPDU 234, and/or a third PPDU 236, e.g., as described below. For example, first PPDU 232 may include first PPDU 132 (FIG. 1), second PPDU 234 may include second PPDU 134 (FIG. 1), and/or third PPDU 236 may include third PPDU 136 (FIG. 1).

In some demonstrative embodiments, as shown in FIG. 2, first PPDU 232 may be separated from PPDU 218 by a fourth SIFS 228, e.g., a MAC layer SIFS.

In some demonstrative embodiments, as shown in FIG. 2, the STA A may initiate the first PPDU 232, which may include a PHY header including a sync indicator set, e.g., to a value of one, e.g., Keep Synch=1, to indicate that STA B is to synchronize second PPDU 234 to first PPDU 232, e.g., by transmitting second PPDU 234 in a Null IFS (NIFS) time 229 from receipt of first PPDU 232.

In some demonstrative embodiments, as shown in FIG. 2, the sync indicator in the first PPDU 232 may indicate to the STA B to transmit PPDU 234 including a short PHY header, e.g., including only a Byte Count (BC) field.

In some demonstrative embodiments, as shown in FIG. 2, the sync indicator in the first PPDU 232 may indicate to the STA B to use the MCS determined in the stage 210, e.g., the MCS negotiated in the stage 210, or the MCS indicated in the RTS frame 212 and/or the CTS frame 214.

In some demonstrative embodiments, a receiver of the STA A may maintain synchronization of the transmitter of the STA A, for example, while awaiting a response from STA B, e.g., by NIFS 229.

In some demonstrative embodiments, STA A may set one or more Rx parameters of STA A, e.g., to receive the response from STA B, for example, according to the RX parameters stored in STA A, e.g., during second stage 220.

In some demonstrative embodiments, as shown in FIG. 2, STA B may receive first PPDU 232, and may send to STA A, the second PPDU 234.

In some demonstrative embodiments, as shown in FIG. 2, second PPDU 234 may be separated from first PPDU 232 by NIFS 229, e.g., a PHY level NIFS.

In some demonstrative embodiments, as shown in FIG. 2, second PPDU 234 may include no preamble, a short PHY header including a byte count (BC) field 235, and the sync indicator set, e.g., to the value of one, e.g., Keep Synch=1.

In some demonstrative embodiments, the sync indicator in PPDU 234 may indicate to STA A to continue exchanging with STA B one or more synchronized PPDUs separated by NIFS, and having the short PHY header, e.g., to enable to reduce link access overhead.

In some demonstrative embodiments, STA B may maintain synchronization achieved, for example, while receiving first PPDU 232.

In some demonstrative embodiments, STA B may use the MCS determined in the stage 210, e.g., the MCS negotiated in the stage 210, or the MCS indicated in the RTS frame 212 and/or the CTS frame 214.

In some demonstrative embodiments, as shown in FIG. 2, STA A may receive second PPDU 234, and may send to STA B, the third PPDU 236, e.g., to continue transmission of synchronized PPDUs to exchange data between STA A and STA B.

In some demonstrative embodiments, as shown in FIG. 2, third PPDU 236 may be separated from second PPDU 234 by a NIFS 231, e.g., a PHY layer NIFS.

In some demonstrative embodiments, as shown in FIG. 2, third PPDU 236 may include no preamble, a short PHY header including the BC field 235 and the sync indicator set, e.g., to the value of one, e.g., Keep Synch=1, for example, to indicate to the STA B that a subsequent PPDU is to be synchronized to the PPDU 236.

In some demonstrative embodiments, the sync indicator may indicate to STA B to continue exchanging synchronized PPDUs with STA A, e.g., low overhead PPDUs separated by NIFS and having the short PHY header.

In some demonstrative embodiments, PPDU 234 and/or PPDU 236 may be transmitted with a short preamble, e.g., instead of the short PHY header.

In some demonstrative embodiments, the short preamble may include, for example, two Golay sequences, e.g., having a length of 128, which may be enough, for example, to enable a frequency and/or phase estimation at a receiver, or a single Golay sequence having a length of 64.

In some demonstrative embodiments, STA B may transmit PPDU 234 in a duplicate mode, for example, if PPDU 236 is transmitted using channel bonding, and PPDU 234 includes a control frame, e.g., a Block acknowledge (Ack).

In some demonstrative embodiments, as shown in FIG. 2, the communication of the short PPDUs 232, 234, and/or 236 may enable to reduce the link access overhead of exchanging the PPDUs, for example, by reducing a size of the PPDUs and/or reducing a time between the PPDUs, e.g., from SIFS to NIFS.

In some demonstrative embodiments, reducing the link access overhead may increase a remaining time to transmit data, which, in turn, may enable to increase an amount of data communicated.

Figure 3:
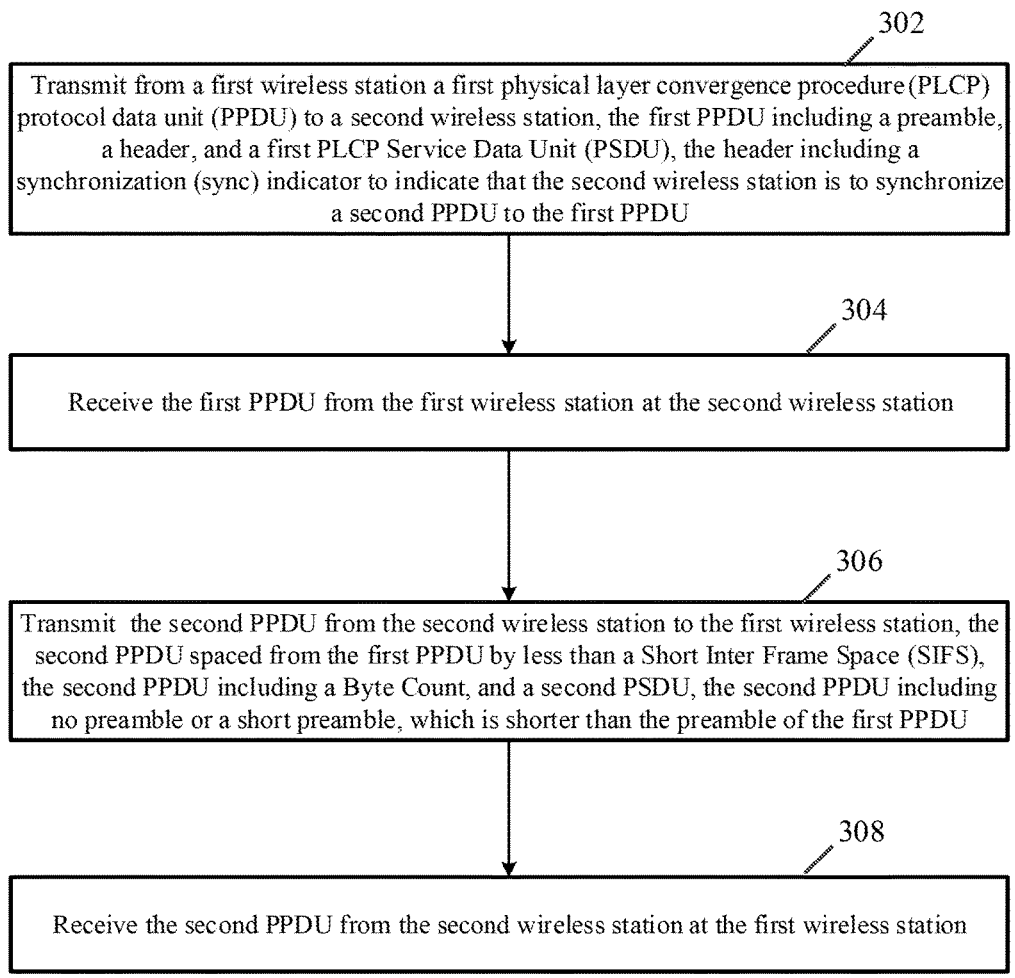
FIG. 3 is a schematic flow-chart illustration of a method of communicating Physical Layer Convergence Procedure (PLCP) Protocol Data Units (PPDUs), in accordance with some demonstrative embodiments.

Reference is made to FIG. 3, which schematically illustrates a method of communicating PPDUs, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 302, the method may include transmitting a first PPDU from a first wireless station to a second wireless station, the first PPDU including a preamble, a header, and a first PSDU, the header including a sync indicator to indicate that the second wireless station is to synchronize a second PPDU to the first PPDU. For example, controller 124 (FIG. 1) may control, cause and/or trigger device 102 (FIG. 1) to transmit to device 140 (FIG. 1) PPDU 132 (FIG. 1), including the preamble, the header and a first PSDU, e.g., as described above.

As indicated at block 304, the method may include receiving the first PPDU from the first wireless station at the second wireless station. For example, controller 154 (FIG. 1) may control, cause and/or trigger device 140 (FIG. 1) to receive PPDU 132 (FIG. 1) from device 102 (FIG. 1), e.g., as described above.

As indicated at block 306, the method may include transmitting the second PPDU from the second wireless station to the first wireless station, the second PPDU spaced from the first PPDU by less than a Short Inter Frame Space (SIFS), the second PPDU including a Byte Count, and a second PSDU, the second PPDU including no preamble or a short preamble, which is shorter than the preamble of the first PPDU. For example, controller 154 (FIG. 1) may control, cause and/or trigger device 140 (FIG. 1) to transmit PPDU 134 (FIG. 1) to device 102 (FIG. 1), spaced by less than a SIFS from PPDU 132 (FIG. 1), e.g., as described above.

As indicated at block 308, the method may include receiving the second PPDU from the second wireless station at the first wireless station. For example, controller 124 (FIG. 1) may control, cause and/or trigger device 102 (FIG. 1) to receive PPDU 134 (FIG. 1) from device 140 (FIG. 1), e.g., as described above.

Figure 4:
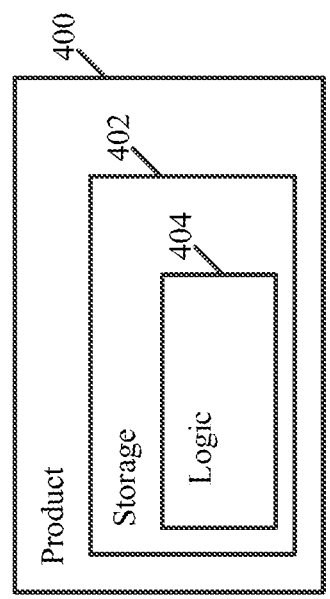
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer-readable non-transitory storage media 402, which may include computer-executable instructions, e.g., implemented by logic 404, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities according to FIGS. 1, 2, and/or 3, and/or one or more operations described herein. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to transmit a first physical layer convergence procedure (PLCP) protocol data unit (PPDU) to a second wireless station, the first PPDU comprising a preamble, a header, and a first PLCP Service Data Unit (PSDU), the header comprising a synchronization (sync) indicator to indicate that the second wireless station is to synchronize a second PPDU to the first PPDU; and receive the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 2 includes the subject matter of Example 1, and optionally, wherein the second PPDU comprises the sync indicator to indicate that the first wireless station is to synchronize a third PPDU to the second PPDU.

Example 3 includes the subject matter of Example 2, and optionally, wherein the apparatus is configured to cause the first wireless station to transmit the third PPDU spaced from the second PPDU by less than the SIFS.

Example 4 includes the subject matter of Example 2 or 3, and optionally, wherein the apparatus is configured to cause the first wireless station to transmit a Request to Send (RTS) frame comprising an indication of a Modulation and Coding Scheme (MCS) prior to transmission of the first PPDU, and to transmit the third PPDU according to the MCS.

Example 5 includes the subject matter of Example 4, and optionally, wherein the apparatus is configured to cause the first wireless station to process the second PPDU according to an MCS indicated in a Clear to Send (CTS) frame received from the second wireless station in response to the RTS frame.

Example 6 includes the subject matter of any one of Examples 1-5, and optionally, wherein the apparatus is configured to cause the first wireless station to determine one or more Receive (Rx) parameters based on one or more PPDUs received from the second wireless station prior to transmission of the first PPDU, and to process receipt of the second PPDU based on the one or more Rx parameters.

Example 7 includes the subject matter of Example 6, and optionally, wherein the one or more Rx parameters comprise an Automatic Gain Control (AGC).

Example 8 includes the subject matter of any one of Examples 1-7, and optionally, wherein the apparatus is configured to cause the first wireless station to communicate with the second wireless station a sequence of synchronized PPDUs comprising at least the first and second PPDUs, a total duration of the sequence of synchronized PPDUs is no longer than a predefined PPDU maximal duration (PPDU-Max) time.

Example 9 includes the subject matter of any one of Examples 1-7, and optionally, wherein the apparatus is configured to cause the first wireless station to communicate with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 10 includes the subject matter of any one of Examples 1-9, and optionally, wherein the second PPDU comprises no preamble.

Example 11 includes the subject matter of any one of Examples 1-9, and optionally, wherein the second PPDU comprises the short preamble comprising no more than two Golay sequences.

Example 12 includes the subject matter of any one of Examples 1-11, and optionally, wherein the apparatus is configured to cause a Medium Access Control (MAC) layer of the first wireless station to process a third PPDU from the second wireless station, while the second PPDU is to be processed by a Physical (PHY) layer of the first wireless station.

Example 13 includes the subject matter of any one of Examples 1-12, and optionally, wherein the second PPDU is spaced from the first PPDU by a Null Inter Frame Space (NIFS).

Example 14 includes the subject matter of any one of Examples 1-13, and optionally, wherein the second PPDU is spaced from the first PPDU by less than 3 microseconds.

Example 15 includes the subject matter of any one of Examples 1-14, and optionally, wherein the second PPDU is spaced from the first PPDU by at least 1 microsecond and no more than 2 microseconds.

Example 16 includes the subject matter of any one of Examples 1-15, and optionally, comprising a radio to transmit the first PPDU and to receive the second PPDU.

Example 17 includes the subject matter of any one of Examples 1-16, and optionally, comprising one or more antennas, a processor, and a memory.

Example 18 includes a system of wireless communication comprising a first wireless station, the first wireless station comprising one or more antennas; a radio; a memory; a processor; and a controller configured to cause the first wireless station to transmit a first physical layer convergence procedure (PLCP) protocol data unit (PPDU) to a second wireless station, the first PPDU comprising a preamble, a header, and a first PLCP Service Data Unit (PSDU), the header comprising a synchronization (sync) indicator to indicate that the second wireless station is to synchronize a second PPDU to the first PPDU; and receive the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 19 includes the subject matter of Example 18, and optionally, wherein the second PPDU comprises the sync indicator to indicate that the first wireless station is to synchronize a third PPDU to the second PPDU.

Example 20 includes the subject matter of Example 19, and optionally, wherein the controller is configured to cause the first wireless station to transmit the third PPDU spaced from the second PPDU by less than the SIFS.

Example 21 includes the subject matter of Example 19 or 20, and optionally, wherein the controller is configured to cause the first wireless station to transmit a Request to Send (RTS) frame comprising an indication of a Modulation and Coding Scheme (MCS) prior to transmission of the first PPDU, and to transmit the third PPDU according to the MCS.

Example 22 includes the subject matter of Example 21, and optionally, wherein the controller is configured to cause the first wireless station to process the second PPDU according to an MCS indicated in a Clear to Send (CTS) frame received from the second wireless station in response to the RTS frame.

Example 23 includes the subject matter of any one of Examples 18-22, and optionally, wherein the controller is configured to cause the first wireless station to determine one or more Receive (Rx) parameters based on one or more PPDUs received from the second wireless station prior to transmission of the first PPDU, and to process receipt of the second PPDU based on the one or more Rx parameters.

Example 24 includes the subject matter of Example 23, and optionally, wherein the one or more Rx parameters comprise an Automatic Gain Control (AGC).

Example 25 includes the subject matter of any one of Examples 18-24, and optionally, wherein the controller is configured to cause the first wireless station to communicate with the second wireless station a sequence of synchronized PPDUs comprising at least the first and second PPDUs, a total duration of the sequence of synchronized PPDUs is no longer than a predefined PPDU maximal duration (PPDU-Max) time.

Example 26 includes the subject matter of any one of Examples 18-24, and optionally, wherein the controller is configured to cause the first wireless station to communicate with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 27 includes the subject matter of any one of Examples 18-26, and optionally, wherein the second PPDU comprises no preamble.

Example 28 includes the subject matter of any one of Examples 18-26, and optionally, wherein the second PPDU comprises the short preamble comprising no more than two Golay sequences.

Example 29 includes the subject matter of any one of Examples 18-28, and optionally, wherein the controller is configured to cause a Medium Access Control (MAC) layer of the first wireless station to process a third PPDU from the second wireless station, while the second PPDU is to be processed by a Physical (PHY) layer of the first wireless station.

Example 30 includes the subject matter of any one of Examples 18-29, and optionally, wherein the second PPDU is spaced from the first PPDU by a Null Inter Frame Space (NIFS).

Example 31 includes the subject matter of any one of Examples 18-30, and optionally, wherein the second PPDU is spaced from the first PPDU by less than 3 microseconds.

Example 32 includes the subject matter of any one of Examples 18-31, and optionally, wherein the second PPDU is spaced from the first PPDU by at least 1 microsecond and no more than 2 microseconds.

Example 33 includes a method to be performed at a first wireless station, the method comprising transmitting a first physical layer convergence procedure (PLCP) protocol data unit (PPDU) to a second wireless station, the first PPDU comprising a preamble, a header, and a first PLCP Service Data Unit (PSDU), the header comprising a synchronization (sync) indicator to indicate that the second wireless station is to synchronize a second PPDU to the first PPDU; and receiving the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 34 includes the subject matter of Example 33, and optionally, wherein the second PPDU comprises the sync indicator to indicate that the first wireless station is to synchronize a third PPDU to the second PPDU.

Example 35 includes the subject matter of Example 34, and optionally, comprising transmitting the third PPDU spaced from the second PPDU by less than the SIFS.

Example 36 includes the subject matter of Example 34 or 35, and optionally, comprising transmitting a Request to Send (RTS) frame comprising an indication of a Modulation and Coding Scheme (MCS) prior to transmission of the first PPDU, and transmitting the third PPDU according to the MCS.

Example 37 includes the subject matter of Example 36, and optionally, comprising processing the second PPDU according to an MCS indicated in a Clear to Send (CTS) frame received from the second wireless station in response to the RTS frame.

Example 38 includes the subject matter of any one of Examples 33-37, and optionally, comprising determining one or more Receive (Rx) parameters based on one or more PPDUs received from the second wireless station prior to transmission of the first PPDU, and processing receipt of the second PPDU based on the one or more Rx parameters.

Example 39 includes the subject matter of Example 38, and optionally, wherein the one or more Rx parameters comprise an Automatic Gain Control (AGC).

Example 40 includes the subject matter of any one of Examples 33-39, and optionally, comprising communicating with the second wireless station a sequence of synchronized PPDUs comprising at least the first and second PPDUs, a total duration of the sequence of synchronized PPDUs is no longer than a predefined PPDU maximal duration (PPDU-Max) time.

Example 41 includes the subject matter of any one of Examples 33-39, and optionally, comprising communicating with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 42 includes the subject matter of any one of Examples 33-41, and optionally, wherein the second PPDU comprises no preamble.

Example 43 includes the subject matter of any one of Examples 33-41, and optionally, wherein the second PPDU comprises the short preamble comprising no more than two Golay sequences.

Example 44 includes the subject matter of any one of Examples 33-43, and optionally, comprising processing a third PPDU from the second wireless station at a Medium Access Control (MAC) layer of the first wireless station, while the second PPDU is to be processed by a Physical (PHY) layer of the first wireless station.

Example 45 includes the subject matter of any one of Examples 33-44, and optionally, wherein the second PPDU is spaced from the first PPDU by a Null Inter Frame Space (NIFS).

Example 46 includes the subject matter of any one of Examples 33-45, and optionally, wherein the second PPDU is spaced from the first PPDU by less than 3 microseconds.

Example 47 includes the subject matter of any one of Examples 33-46, and optionally, wherein the second PPDU is spaced from the first PPDU by at least 1 microsecond and no more than 2 microseconds.

Example 48 includes a product comprising one or more tangible computer-readable non-transitory storage media comprising computer-executable instructions operable to, when executed by at least one computer processor, enable the at least one computer processor to implement operations at a first wireless station, the operations comprising transmitting a first physical layer convergence procedure (PLCP) protocol data unit (PPDU) to a second wireless station, the first PPDU comprising a preamble, a header, and a first PLCP Service Data Unit (PSDU), the header comprising a synchronization (sync) indicator to indicate that the second wireless station is to synchronize a second PPDU to the first PPDU; and receiving the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 49 includes the subject matter of Example 48, and optionally, wherein the second PPDU comprises the sync indicator to indicate that the first wireless station is to synchronize a third PPDU to the second PPDU.

Example 50 includes the subject matter of Example 49, and optionally, wherein the operations comprise transmitting the third PPDU spaced from the second PPDU by less than the SIFS.

Example 51 includes the subject matter of Example 49 or 50, and optionally, wherein the operations comprise transmitting a Request to Send (RTS) frame comprising an indication of a Modulation and Coding Scheme (MCS) prior to transmission of the first PPDU, and transmitting the third PPDU according to the MCS.

Example 52 includes the subject matter of Example 51, and optionally, wherein the operations comprise processing the second PPDU according to an MCS indicated in a Clear to Send (CTS) frame received from the second wireless station in response to the RTS frame.

Example 53 includes the subject matter of any one of Examples 48-52, and optionally, wherein the operations comprise determining one or more Receive (Rx) parameters based on one or more PPDUs received from the second wireless station prior to transmission of the first PPDU, and processing receipt of the second PPDU based on the one or more Rx parameters.

Example 54 includes the subject matter of Example 53, and optionally, wherein the one or more Rx parameters comprise an Automatic Gain Control (AGC).

Example 55 includes the subject matter of any one of Examples 48-54, and optionally, wherein the operations comprise communicating with the second wireless station a sequence of synchronized PPDUs comprising at least the first and second PPDUs, a total duration of the sequence of synchronized PPDUs is no longer than a predefined PPDU maximal duration (PPDUMax) time.

Example 56 includes the subject matter of any one of Examples 48-54, and optionally, wherein the operations comprise communicating with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 57 includes the subject matter of any one of Examples 48-56, and optionally, wherein the second PPDU comprises no preamble.

Example 58 includes the subject matter of any one of Examples 48-56, and optionally, wherein the second PPDU comprises the short preamble comprising no more than two Golay sequences.

Example 59 includes the subject matter of any one of Examples 48-58, and optionally, wherein the operations comprise processing a third PPDU from the second wireless station at a Medium Access Control (MAC) layer of the first wireless station, while the second PPDU is to be processed by a Physical (PHY) layer of the first wireless station.

Example 60 includes the subject matter of any one of Examples 48-59, and optionally, wherein the second PPDU is spaced from the first PPDU by a Null Inter Frame Space (NIFS).

Example 61 includes the subject matter of any one of Examples 48-60, and optionally, wherein the second PPDU is spaced from the first PPDU by less than 3 microseconds.

Example 62 includes the subject matter of any one of Examples 48-61, and optionally, wherein the second PPDU is spaced from the first PPDU by at least 1 microsecond and no more than 2 microseconds.

Example 63 includes an apparatus of wireless communication by a first wireless station, the apparatus comprising means for transmitting a first physical layer convergence procedure (PLCP) protocol data unit (PPDU) to a second wireless station, the first PPDU comprising a preamble, a header, and a first PLCP Service Data Unit (PSDU), the header comprising a synchronization (sync) indicator to indicate that the second wireless station is to synchronize a second PPDU to the first PPDU; and means for receiving the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 64 includes the subject matter of Example 63, and optionally, wherein the second PPDU comprises the sync indicator to indicate that the first wireless station is to synchronize a third PPDU to the second PPDU.

Example 65 includes the subject matter of Example 64, and optionally, comprising means for transmitting the third PPDU spaced from the second PPDU by less than the SIFS.

Example 66 includes the subject matter of Example 64 or 65, and optionally, comprising means for transmitting a Request to Send (RTS) frame comprising an indication of a Modulation and Coding Scheme (MCS) prior to transmission of the first PPDU, and transmitting the third PPDU according to the MCS.

Example 67 includes the subject matter of Example 66, and optionally, comprising means for processing the second PPDU according to an MCS indicated in a Clear to Send (CTS) frame received from the second wireless station in response to the RTS frame.

Example 68 includes the subject matter of any one of Examples 63-67, and optionally, comprising means for determining one or more Receive (Rx) parameters based on one or more PPDUs received from the second wireless station prior to transmission of the first PPDU, and processing receipt of the second PPDU based on the one or more Rx parameters.

Example 69 includes the subject matter of Example 68, and optionally, wherein the one or more Rx parameters comprise an Automatic Gain Control (AGC).

Example 70 includes the subject matter of any one of Examples 63-69, and optionally, comprising means for communicating with the second wireless station a sequence of synchronized PPDUs comprising at least the first and second PPDUs, a total duration of the sequence of synchronized PPDUs is no longer than a predefined PPDU maximal duration (PPDUMax) time.

Example 71 includes the subject matter of any one of Examples 63-69, and optionally, comprising means for communicating with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 72 includes the subject matter of any one of Examples 63-71, and optionally, wherein the second PPDU comprises no preamble.

Example 73 includes the subject matter of any one of Examples 63-71, and optionally, wherein the second PPDU comprises the short preamble comprising no more than two Golay sequences.

Example 74 includes the subject matter of any one of Examples 63-73, and optionally, comprising means for processing a third PPDU from the second wireless station at a Medium Access Control (MAC) layer of the first wireless station, while the second PPDU is to be processed by a Physical (PHY) layer of the first wireless station.

Example 75 includes the subject matter of any one of Examples 63-74, and optionally, wherein the second PPDU is spaced from the first PPDU by a Null Inter Frame Space (NIFS).

Example 76 includes the subject matter of any one of Examples 63-75, and optionally, wherein the second PPDU is spaced from the first PPDU by less than 3 microseconds.

Example 77 includes the subject matter of any one of Examples 63-76, and optionally, wherein the second PPDU is spaced from the first PPDU by at least 1 microsecond and no more than 2 microseconds.

Example 78 includes an apparatus comprising circuitry and logic configured to cause a first wireless station to receive a first physical layer convergence procedure (PLCP) protocol data unit (PPDU) from a second wireless station, the first PPDU comprising a preamble, a header, and a first PLCP Service Data Unit (PSDU), the header comprising a synchronization (sync) indicator to indicate that the first wireless station is to synchronize a second PPDU to the first PPDU; and transmit the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 79 includes the subject matter of Example 78, and optionally, wherein the second PPDU comprises the sync indicator to indicate that the second wireless station is to synchronize a third PPDU to the second PPDU.

Example 80 includes the subject matter of Example 79, and optionally, wherein the apparatus is configured to cause the first wireless station to receive the third PPDU spaced from the second PPDU by less than the SIFS.

Example 81 includes the subject matter of Example 79 or 80, and optionally, wherein the apparatus is configured to cause the first wireless station to receive from the second wireless station a Request to Send (RTS) frame comprising an indication of a Modulation and Coding Scheme (MCS) prior to the first PPDU, and to process the third PPDU according to the MCS.

Example 82 includes the subject matter of Example 81, and optionally, wherein the apparatus is configured to cause the first wireless station to transmit a Clear to Send (CTS) frame to the second wireless station in response to the RTS frame, the CTS frame comprising an indication of an MCS to be applied to the second PPDU.

Example 83 includes the subject matter of any one of Examples 78-82, and optionally, wherein the apparatus is configured to cause the first wireless station to determine one or more Receive (Rx) parameters based on one or more PPDUs received from the second wireless station prior to the first PPDU, and to process receipt of the first PPDU based on the one or more Rx parameters.

Example 84 includes the subject matter of Example 83, and optionally, wherein the one or more Rx parameters comprise an Automatic Gain Control (AGC).

Example 85 includes the subject matter of any one of Examples 78-84, and optionally, wherein the apparatus is configured to cause the first wireless station to communicate with the second wireless station a sequence of synchronized PPDUs comprising at least the first and second PPDUs, a total duration of the sequence of synchronized PPDUs is no longer than a predefined PPDU maximal duration (PPDUMax) time.

Example 86 includes the subject matter of any one of Examples 78-84, and optionally, wherein the apparatus is configured to cause the first wireless station to communicate with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 87 includes the subject matter of any one of Examples 78-86, and optionally, wherein the second PPDU comprises no preamble.

Example 88 includes the subject matter of any one of Examples 78-86, and optionally, wherein the second PPDU comprises the short preamble comprising no more than two Golay sequences.

Example 89 includes the subject matter of any one of Examples 78-88, and optionally, wherein the apparatus is configured to cause a Medium Access Control (MAC) layer of the first wireless station to process the second PPDU, while the first PPDU is to be processed by a Physical (PHY) layer of the first wireless station.

Example 90 includes the subject matter of any one of Examples 78-89, and optionally, wherein the second PPDU is spaced from the first PPDU by a Null Inter Frame Space (NIFS).

Example 91 includes the subject matter of any one of Examples 78-90, and optionally, wherein the second PPDU is spaced from the first PPDU by less than 3 microseconds.

Example 92 includes the subject matter of any one of Examples 78-91, and optionally, wherein the second PPDU is spaced from the first PPDU by at least 1 microsecond and no more than 2 microseconds.

Example 93 includes the subject matter of any one of Examples 78-92, and optionally, comprising a radio to receive the first PPDU and to transmit the second PPDU.

Example 94 includes the subject matter of any one of Examples 78-93, and optionally, comprising one or more antennas, a processor, and a memory.

Example 95 includes a system of wireless communication comprising a first wireless station, the first wireless station comprising one or more antennas; a radio; a memory; a processor; and a controller configured to cause the first wireless station to receive a first physical layer convergence procedure (PLCP) protocol data unit (PPDU) from a second wireless station, the first PPDU comprising a preamble, a header, and a first PLCP Service Data Unit (PSDU), the header comprising a synchronization (sync) indicator to indicate that the first wireless station is to synchronize a second PPDU to the first PPDU; and transmit the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 96 includes the subject matter of Example 95, and optionally, wherein the second PPDU comprises the sync indicator to indicate that the second wireless station is to synchronize a third PPDU to the second PPDU.

Example 97 includes the subject matter of Example 96, and optionally, wherein the controller is configured to cause the first wireless station to receive the third PPDU spaced from the second PPDU by less than the SIFS.

Example 98 includes the subject matter of Example 96 or 97, and optionally, wherein the controller is configured to cause the first wireless station to receive from the second wireless station a Request to Send (RTS) frame comprising an indication of a Modulation and Coding Scheme (MCS) prior to the first PPDU, and to process the third PPDU according to the MCS.

Example 99 includes the subject matter of Example 98, and optionally, wherein the controller is configured to cause the first wireless station to transmit a Clear to Send (CTS) frame to the second wireless station in response to the RTS frame, the CTS frame comprising an indication of an MCS to be applied to the second PPDU.

Example 100 includes the subject matter of any one of Examples 95-99, and optionally, wherein the controller is configured to cause the first wireless station to determine one or more Receive (Rx) parameters based on one or more PPDUs received from the second wireless station prior to the first PPDU, and to process receipt of the first PPDU based on the one or more Rx parameters.

Example 101 includes the subject matter of Example 100, and optionally, wherein the one or more Rx parameters comprise an Automatic Gain Control (AGC).

Example 102 includes the subject matter of any one of Examples 95-101, and optionally, wherein the controller is configured to cause the first wireless station to communicate with the second wireless station a sequence of synchronized PPDUs comprising at least the first and second PPDUs, a total duration of the sequence of synchronized PPDUs is no longer than a predefined PPDU maximal duration (PPDU-Max) time.

Example 103 includes the subject matter of any one of Examples 95-101, and optionally, wherein the controller is configured to cause the first wireless station to communicate with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 104 includes the subject matter of any one of Examples 95-103, and optionally, wherein the second PPDU comprises no preamble.

Example 105 includes the subject matter of any one of Examples 95-103, and optionally, wherein the second PPDU comprises the short preamble comprising no more than two Golay sequences.

Example 106 includes the subject matter of any one of Examples 95-105, and optionally, wherein the controller is configured to cause a Medium Access Control (MAC) layer of the first wireless station to process the second PPDU, while the first PPDU is to be processed by a Physical (PHY) layer of the first wireless station.

Example 107 includes the subject matter of any one of Examples 95-106, and optionally, wherein the second PPDU is spaced from the first PPDU by a Null Inter Frame Space (NIFS).

Example 108 includes the subject matter of any one of Examples 95-107, and optionally, wherein the second PPDU is spaced from the first PPDU by less than 3 microseconds.

Example 109 includes the subject matter of any one of Examples 95-108, and optionally, wherein the second PPDU is spaced from the first PPDU by at least 1 microsecond and no more than 2 microseconds.

Example 110 includes a method to be performed at a first wireless station, the method comprising receiving a first physical layer convergence procedure (PLCP) protocol data unit (PPDU) from a second wireless station, the first PPDU comprising a preamble, a header, and a first PLCP Service Data Unit (PSDU), the header comprising a synchronization (sync) indicator to indicate that the first wireless station is to synchronize a second PPDU to the first PPDU; and transmitting the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 111 includes the subject matter of Example 110, and optionally, wherein the second PPDU comprises the sync indicator to indicate that the second wireless station is to synchronize a third PPDU to the second PPDU.

Example 112 includes the subject matter of Example 111, and optionally, comprising receiving the third PPDU spaced from the second PPDU by less than the SIFS.

Example 113 includes the subject matter of Example 111 or 112, and optionally, comprising receiving from the second wireless station a Request to Send (RTS) frame comprising an indication of a Modulation and Coding Scheme (MCS) prior to the first PPDU, and processing the third PPDU according to the MCS.

Example 114 includes the subject matter of Example 113, and optionally, comprising transmitting a Clear to Send (CTS) frame to the second wireless station in response to the RTS frame, the CTS frame comprising an indication of an MCS to be applied to the second PPDU.

Example 115 includes the subject matter of any one of Examples 110-114, and optionally, comprising determining one or more Receive (Rx) parameters based on one or more PPDUs received from the second wireless station prior to the first PPDU, and processing receipt of the first PPDU based on the one or more Rx parameters.

Example 116 includes the subject matter of Example 115, and optionally, wherein the one or more Rx parameters comprise an Automatic Gain Control (AGC).

Example 117 includes the subject matter of any one of Examples 110-116, and optionally, comprising communicating with the second wireless station a sequence of synchronized PPDUs comprising at least the first and second PPDUs, a total duration of the sequence of synchronized PPDUs is no longer than a predefined PPDU maximal duration (PPDUMax) time.

Example 118 includes the subject matter of any one of Examples 110-116, and optionally, comprising communicating with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 119 includes the subject matter of any one of Examples 110-118, and optionally, wherein the second PPDU comprises no preamble.

Example 120 includes the subject matter of any one of Examples 110-118, and optionally, wherein the second PPDU comprises the short preamble comprising no more than two Golay sequences.

Example 121 includes the subject matter of any one of Examples 110-120, and optionally, comprising processing the second PPDU at a Medium Access Control (MAC) layer of the first wireless station, while the first PPDU is to be processed by a Physical (PHY) layer of the first wireless station.

Example 122 includes the subject matter of any one of Examples 110-121, and optionally, wherein the second PPDU is spaced from the first PPDU by a Null Inter Frame Space (NIFS).

Example 123 includes the subject matter of any one of Examples 110-122, and optionally, wherein the second PPDU is spaced from the first PPDU by less than 3 microseconds.

Example 124 includes the subject matter of any one of Examples 110-123, and optionally, wherein the second PPDU is spaced from the first PPDU by at least 1 microsecond and no more than 2 microseconds.

Example 125 includes a product comprising one or more tangible computer-readable non-transitory storage media comprising computer-executable instructions operable to, when executed by at least one computer processor, enable the at least one computer processor to implement operations at a first wireless station, the operations comprising receiving a first physical layer convergence procedure (PLCP) protocol data unit (PPDU) from a second wireless station, the first PPDU comprising a preamble, a header, and a first PLCP Service Data Unit (PSDU), the header comprising a synchronization (sync) indicator to indicate that the first wireless station is to synchronize a second PPDU to the first PPDU; and transmitting the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 126 includes the subject matter of Example 125, and optionally, wherein the second PPDU comprises the sync indicator to indicate that the second wireless station is to synchronize a third PPDU to the second PPDU.

Example 127 includes the subject matter of Example 126, and optionally, wherein the operations comprise receiving the third PPDU spaced from the second PPDU by less than the SIFS.

Example 128 includes the subject matter of Example 126 or 127, and optionally, wherein the operations comprise receiving from the second wireless station a Request to Send (RTS) frame comprising an indication of a Modulation and Coding Scheme (MCS) prior to the first PPDU, and processing the third PPDU according to the MCS.

Example 129 includes the subject matter of Example 128, and optionally, wherein the operations comprise transmitting a Clear to Send (CTS) frame to the second wireless station in response to the RTS frame, the CTS frame comprising an indication of an MCS to be applied to the second PPDU.

Example 130 includes the subject matter of any one of Examples 125-129, and optionally, wherein the operations comprise determining one or more Receive (Rx) parameters based on one or more PPDUs received from the second wireless station prior to the first PPDU, and processing receipt of the first PPDU based on the one or more Rx parameters.

Example 131 includes the subject matter of Example 130, and optionally, wherein the one or more Rx parameters comprise an Automatic Gain Control (AGC).

Example 132 includes the subject matter of any one of Examples 125-131, and optionally, wherein the operations comprise communicating with the second wireless station a sequence of synchronized PPDUs comprising at least the first and second PPDUs, a total duration of the sequence of synchronized PPDUs is no longer than a predefined PPDU maximal duration (PPDUMax) time.

Example 133 includes the subject matter of any one of Examples 125-131, and optionally, wherein the operations comprise communicating with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 134 includes the subject matter of any one of Examples 125-133, and optionally, wherein the second PPDU comprises no preamble.

Example 135 includes the subject matter of any one of Examples 125-133, and optionally, wherein the second PPDU comprises the short preamble comprising no more than two Golay sequences.

Example 136 includes the subject matter of any one of Examples 125-135, and optionally, wherein the operations comprise processing the second PPDU at a Medium Access Control (MAC) layer of the first wireless station, while the first PPDU is to be processed by a Physical (PHY) layer of the first wireless station.

Example 137 includes the subject matter of any one of Examples 125-136, and optionally, wherein the second PPDU is spaced from the first PPDU by a Null Inter Frame Space (NIFS).

Example 138 includes the subject matter of any one of Examples 125-137, and optionally, wherein the second PPDU is spaced from the first PPDU by less than 3 microseconds.

Example 139 includes the subject matter of any one of Examples 125-138, and optionally, wherein the second PPDU is spaced from the first PPDU by at least 1 microsecond and no more than 2 microseconds.

Example 140 includes an apparatus of wireless communication by a first wireless station, the apparatus comprising means for receiving a first physical layer convergence procedure (PLCP) protocol data unit (PPDU) from a second wireless station, the first PPDU comprising a preamble, a header, and a first PLCP Service Data Unit (PSDU), the header comprising a synchronization (sync) indicator to indicate that the first wireless station is to synchronize a second PPDU to the first PPDU; and means for transmitting the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

Example 141 includes the subject matter of Example 140, and optionally, wherein the second PPDU comprises the sync indicator to indicate that the second wireless station is to synchronize a third PPDU to the second PPDU.

Example 142 includes the subject matter of Example 141, and optionally, comprising means for receiving the third PPDU spaced from the second PPDU by less than the SIFS.

Example 143 includes the subject matter of Example 141 or 142, and optionally, comprising means for receiving from the second wireless station a Request to Send (RTS) frame comprising an indication of a Modulation and Coding Scheme (MCS) prior to the first PPDU, and processing the third PPDU according to the MCS.

Example 144 includes the subject matter of Example 143, and optionally, comprising means for transmitting a Clear to Send (CTS) frame to the second wireless station in response to the RTS frame, the CTS frame comprising an indication of an MCS to be applied to the second PPDU.

Example 145 includes the subject matter of any one of Examples 140-144, and optionally, comprising means for determining one or more Receive (Rx) parameters based on one or more PPDUs received from the second wireless station prior to the first PPDU, and processing receipt of the first PPDU based on the one or more Rx parameters.

Example 146 includes the subject matter of Example 145, and optionally, wherein the one or more Rx parameters comprise an Automatic Gain Control (AGC).

Example 147 includes the subject matter of any one of Examples 140-146, and optionally, comprising means for communicating with the second wireless station a sequence of synchronized PPDUs comprising at least the first and second PPDUs, a total duration of the sequence of synchronized PPDUs is no longer than a predefined PPDU maximal duration (PPDUMax) time.

Example 148 includes the subject matter of any one of Examples 140-146, and optionally, comprising means for communicating with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

Example 149 includes the subject matter of any one of Examples 140-148, and optionally, wherein the second PPDU comprises no preamble.

Example 150 includes the subject matter of any one of Examples 140-148, and optionally, wherein the second PPDU comprises the short preamble comprising no more than two Golay sequences.

Example 151 includes the subject matter of any one of Examples 140-150, and optionally, comprising means for processing the second PPDU at a Medium Access Control (MAC) layer of the first wireless station, while the first PPDU is to be processed by a Physical (PHY) layer of the first wireless station.

Example 152 includes the subject matter of any one of Examples 140-151, and optionally, wherein the second PPDU is spaced from the first PPDU by a Null Inter Frame Space (NIFS).

Example 153 includes the subject matter of any one of Examples 140-152, and optionally, wherein the second PPDU is spaced from the first PPDU by less than 3 microseconds.

Example 154 includes the subject matter of any one of Examples 140-153, and optionally, wherein the second PPDU is spaced from the first PPDU by at least 1 microsecond and no more than 2 microseconds.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a first wireless station to:
   transmit a first physical layer convergence procedure (PLCP) protocol data unit (PPDU) to a second wireless station, the first PPDU configured to support synchronization between the first wireless station and the second wireless station for communication of one or more subsequent PPDUs, the first PPDU comprising a preamble, a header, and a first PLCP Service Data Unit (PSDU), the header comprising a synchronization (sync) indicator to indicate that the second wireless station is to synchronize a second PPDU to the first PPDU; and
   receive the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

2. The apparatus of claim 1, wherein the second PPDU comprises the sync indicator to indicate that the first wireless station is to synchronize a third PPDU to the second PPDU.

3. The apparatus of claim 2 configured to cause the first wireless station to transmit the third PPDU spaced from the second PPDU by less than the SIFS.

4. The apparatus of claim 2 configured to cause the first wireless station to transmit a Request to Send (RTS) frame comprising an indication of a Modulation and Coding Scheme (MCS) prior to transmission of the first PPDU, and to transmit the third PPDU according to the MCS.

5. The apparatus of claim 4 configured to cause the first wireless station to process the second PPDU according to an MCS indicated in a Clear to Send (CTS) frame received from the second wireless station in response to the RTS frame.

6. The apparatus of claim 1 configured to cause the first wireless station to determine one or more Receive (Rx) parameters based on one or more PPDUs received from the second wireless station prior to transmission of the first PPDU, and to process receipt of the second PPDU based on the one or more Rx parameters.

7. The apparatus of claim 1 configured to cause the first wireless station to communicate with the second wireless station a sequence of synchronized PPDUs comprising at least the first and second PPDUs, a total duration of the sequence of synchronized PPDUs is no longer than a predefined PPDU maximal duration (PPDUMax) time.

8. The apparatus of claim 1 configured to cause the first wireless station to communicate with the second wireless station a sequence of synchronized PPDUs comprising at least the first and second PPDUs, a total duration of the sequence of synchronized PPDUs is no longer than a duration value from a Personal Basic Service Set (PBSS) Control Point (PCP) or Access Point (AP) (PCP/AP) station (STA).

9. The apparatus of claim 1, wherein the second PPDU comprises no preamble.

10. The apparatus of claim 1, wherein the second PPDU comprises the short preamble comprising no more than two Golay sequences.

11. The apparatus of claim 1 configured to cause a Medium Access Control (MAC) layer of the first wireless station to process a third PPDU from the second wireless station, while the second PPDU is to be processed by a Physical (PHY) layer of the first wireless station.

12. The apparatus of claim 1, wherein the second PPDU is spaced from the first PPDU by a Null Inter Frame Space (NIFS).

13. The apparatus of claim 1 comprising a radio to transmit the first PPDU and to receive the second PPDU.

14. The apparatus of claim 1 comprising one or more antennas, a processor, and a memory.

15. A product comprising one or more tangible computer-readable non-transitory storage media comprising computer-executable instructions operable to, when executed by at least one processor, enable the at least one processor to cause a first wireless station to:
    transmit a first physical layer convergence procedure (PLCP) protocol data unit (PPDU) to a second wireless station, the first PPDU configured to support synchronization between the first wireless station and the second wireless station for communication of one or more subsequent PPDUs, the first PPDU comprising a preamble, a header, and a first PLCP Service Data Unit (PSDU), the header comprising a synchronization (sync) indicator to indicate that the second wireless station is to synchronize a second PPDU to the first PPDU; and
    receive the second PPDU from the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

16. The product of claim 15, wherein the second PPDU comprises the sync indicator to indicate that the first wireless station is to synchronize a third PPDU to the second PPDU.

17. An apparatus comprising circuitry and logic configured to cause a first wireless station to:
    receive a first physical layer convergence procedure (PLCP) protocol data unit (PPDU) from a second wireless station, the first PPDU configured to support synchronization between the first wireless station and the second wireless station for communication of one or more subsequent PPDUs, the first PPDU comprising a preamble, a header, and a first PLCP Service Data Unit (PSDU), the header comprising a synchronization (sync) indicator to indicate that the first wireless station is to synchronize a second PPDU to the first PPDU; and
    transmit the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

18. The apparatus of claim 17, wherein the second PPDU comprises the sync indicator to indicate that the second wireless station is to synchronize a third PPDU to the second PPDU.

19. The apparatus of claim 18 configured to cause the first wireless station to receive from the second wireless station a Request to Send (RTS) frame comprising an indication of a Modulation and Coding Scheme (MCS) prior to the first PPDU, and to process the third PPDU according to the MCS.

20. The apparatus of claim 19 configured to cause the first wireless station to transmit a Clear to Send (CTS) frame to the second wireless station in response to the RTS frame, the CTS frame comprising an indication of an MCS to be applied to the second PPDU.

21. The apparatus of claim 17 configured to cause the first wireless station to determine one or more Receive (Rx) parameters based on one or more PPDUs received from the second wireless station prior to the first PPDU, and to process receipt of the first PPDU based on the one or more Rx parameters.

22. The apparatus of claim 17 configured to cause a Medium Access Control (MAC) layer of the first wireless station to process the second PPDU, while the first PPDU is to be processed by a Physical (PHY) layer of the first wireless station.

23. The apparatus of claim 17 comprising one or more antennas, a processor, and a memory.

24. A product comprising one or more tangible computer-readable non-transitory storage media comprising computer-executable instructions operable to, when executed by at least one processor, enable the at least one processor to cause a first wireless station to:
    receive a first physical layer convergence procedure (PLCP) protocol data unit (PPDU) from a second wireless station, the first PPDU configured to support synchronization between the first wireless station and the second wireless station for communication of one or more subsequent PPDUs, the first PPDU comprising a preamble, a header, and a first PLCP Service Data Unit (PSDU), the header comprising a synchronization (sync) indicator to indicate that the first wireless station is to synchronize a second PPDU to the first PPDU; and
    transmit the second PPDU to the second wireless station, the second PPDU spaced from the first PPDU by less than a Short Inter Frame Space (SIFS), the second PPDU comprising a Byte Count, and a second PSDU, the second PPDU comprising no preamble or a short preamble, which is shorter than the preamble of the first PPDU.

25. The product of claim 24, wherein the instructions, when executed, cause the first wireless station to determine one or more Receive (Rx) parameters based on one or more PPDUs received from the second wireless station prior to the first PPDU, and process receipt of the first PPDU based on the one or more Rx parameters.

* * * * *